July 13, 1965    J. D. RICHARD    3,194,057
ULTRASONIC VISCOSIMETER
Filed Oct. 15, 1962

INVENTOR
Joseph D. Richard

United States Patent Office 3,194,057
Patented July 13, 1965

3,194,057
ULTRASONIC VISCOSIMETER
Joseph D. Richard, 3569 Loquat Ave., Miami, Fla.
Filed Oct. 15, 1962, Ser. No. 230,364
5 Claims. (Cl. 73—55)

This invention relates to a method and apparatus for measuring the viscosity of fluids. The present invention describes a measuring system which is particularly suitable for the monitoring and recording of viscosity in continuous flow and automatic process control systems.

In the past, numerous instruments have been devised for the measurement of viscosity. Most of these viscosimeters were not adaptable for use in continuous measuring and recording systems. The viscosimeters which have been adapted for continuous measurements have not been suitable for the direct measurement of kinematic viscosity.

It is an object, therefore, of this invention to provide a method and apparatus for measuring viscosity which overcomes many of the disadvantages of viscosimeters used in the past.

The principal object of the present invention is to provide a viscosimeter which is ideally suited for measuring and recording the kinematic viscosity of a continuously flowing fluid and which may be readily incorporated into an automatic process control system wherein a constant viscosity value is continually maintained.

A further object of the present invention is to provide a continuously recording viscosity measuring system which has no movable parts and which requires no mechanical projections into the fluid medium.

Other objects and advantages of this invention will become more apparent from the following discussion of the principles involved and the description of the drawings.

The present invention provides a method and apparatus for measuring the viscosity of a fluid as a function of the attenuation of an ultrasonic wave. The ultrasonic attenuation results from the viscous interaction between the fluid and a porous solid through which it is made to flow. Whenever acoustic waves are transmitted through a fluid medium there is a loss of acoustic energy. The sources of this loss may be divided into two general categories, those associated with conditions at the boundaries of the medium and those due to the dissipation of acoustic energy in the medium itself. The first type of loss is of particular significance when the volume of the fluid is small in comparison with the area of the bounding walls, as when sound waves are transmitted through a narrow tube. The acoustic particle velocity amplitude then increases from zero at the walls to a maximum in the center of the tube, thus producing dissipative forces which are a function of the shearing viscosity of the medium. Laminar motion exists throughout the cross section of the tube and the velocity increases rapidly from zero at the walls to nearly its maximum value at a distance $(\mu/\rho\omega)^{1/2}$ from the walls, where $\mu$ is the coefficient of shear viscosity and $\rho$ the density of the fluid, and $\omega$ the angular frequency of the waves traveling inside the tube. In tubes having a radius $a$ such that:

$$a > 10\sqrt{\frac{\mu}{\rho\omega}}$$

there is a virtual increase in the density of the medium that results from the additional mass corresponding to viscous forces so that the effective density of the viscous medium is $$\rho' = \rho\left(1 + \frac{1}{a}\sqrt{\frac{2\mu}{\rho\omega}}\right)$$

This increase in the effective density may be expected to decrease the propagation velocity of acoustic waves. This is equivalent to the lowering of the natural frequency of a vibrating system that results from loading it with an added mass. Since the velocity of sound is inversely proportional to the square root of the density of the medium, we may consider the velocity of wave propagation in the tube to be $$c' \approx c\left(1 - \frac{1}{2a}\sqrt{\frac{2\mu}{\rho\omega}}\right)$$

It will be seen that for large values of $\omega$ the damped velocity $c'$ approaches the normal velocity $c$, so that the effect of viscosity on modifying the velocity of sound transmission in small tubes is greater at low than at high frequencies. When the effective density $\rho'$ and the damped velocity $c'$ are applied to the general differential equations for acoustic waves in a dissipative medium the attenuation constant $\alpha'$ is $$\alpha' \approx \frac{1}{ac}\sqrt{\frac{\mu\omega}{2\rho}}$$

Since $\alpha'$ increases as the square root of $\omega$, the damping due to viscous losses is greater at high than at low frequencies. It should be noted that the effect of viscosity on the propagation of acoustic waves in tubes, as indicated by the above equation, is dependent upon the ratio, $\mu/\rho$, rather than on $\mu$ alone. For this reason the ratio $\mu/\rho$ is sometimes replaced by $\nu = \mu/\rho$ where $\nu$ is the kinematic coefficient of viscosity. Kinematic viscosity is a more fundamental quantity than is the dynamic viscosity. The unit of kinematic viscosity is the "Stokes" and the corresponding unit of dynamic viscosity is the "Poise."

Figure 1:
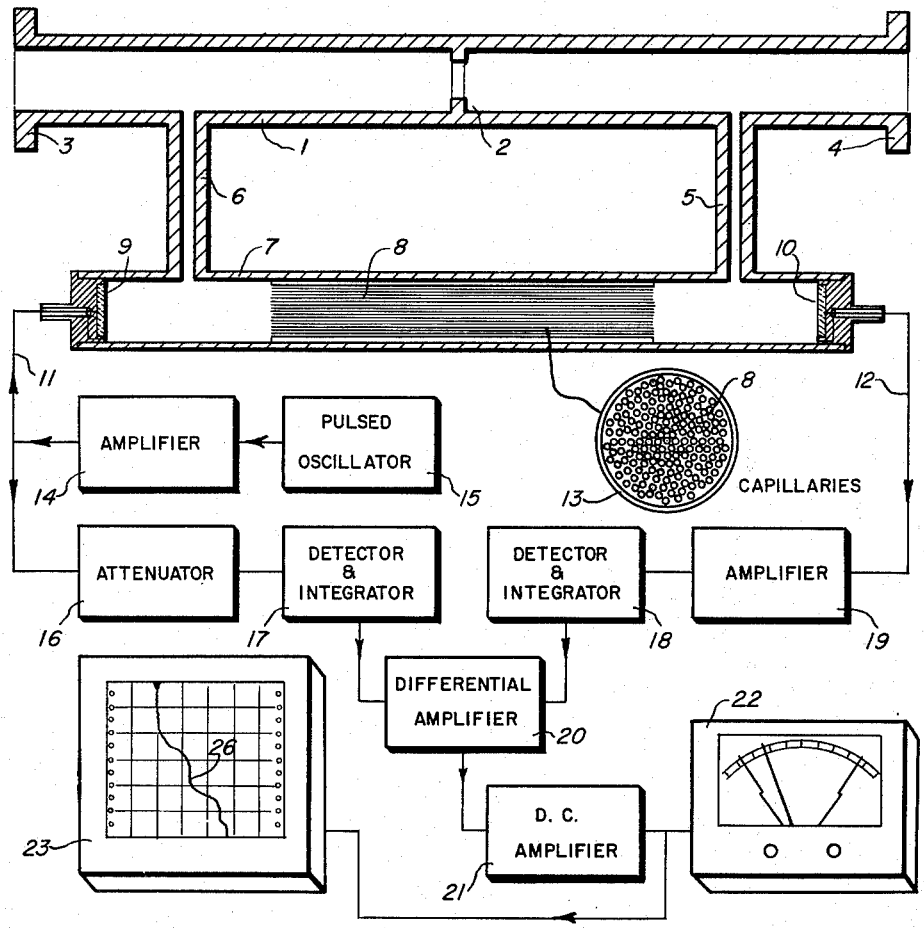
FIGURE 1 is a schematic drawing and block diagram which shows the operation of the ultrasonic viscosimeter according to my invention.

Referring more specifically to FIGURE 1, a conduit or pipe section 1 is shown with an orifice constriction 2 in the middle portion. The orifice 2 causes a pressure difference within the pipe between the two ends when a fluid is made to flow through it. Thus when fluid flows through the pipe 1, for example from left to right, a portion of the fluid will flow down the by-pass line 6, through the measuring chamber 7, and back into the main line 1 through the return line 5. The flow rate of the fluid through the measuring chamber 7 will always be proportional to the flow through the main line 1.

A bundle of capillary tubes 8 is shown within the measuring chamber 7. The bundle of capillary tubes 8 are held together by means of the cylinder 13 so that they may be easily removed from the measuring chamber 7. For purposes of illustration, the capillary tubes shown are of glass; they have an inside diameter of one millimeter and a length of twenty centimeters. End plates are fitted into each end of the measuring chamber. An ultrasonic transducer 9, for transmitting ultrasonic energy, is mounted inside the left end of the measuring chamber. A similar receiving ultrasonic transducer 10 is mounted inside the right end. A pulsed oscillator 15 generates ultrasonic frequency pulses of, for example, 100 kilocycles per second which are amplified by the amplifier 14 and transduced to ultrasonic pulses by the transmitting transducer 9. The ultrasonic pulses traverse the length of the measuring chamber 7 through the capillary bundle 8 where absorption occurs which is proportional to the viscosity of the contained fluid. The ultrasonic pulses are converted to corresponding electrical signals by means of the receiving transducer 10. The received pulses are amplified by the receiving amplifier 19, detected and integrated at 18 and the resulting D.C. voltage fed into one input of the differential amplifier 20. The output of the transmitting amplifier 14 is also fed into the attenuator 16 thence to the detector-integrator 17, and the resulting D.C. voltage fed into the other input of the differential amplifier 20. Thus the output of the differential amplifier 20 is proportional to the absorption of ultrasonic pulses which are transmitted through the measuring chamber 7. The differential amplifier 20 output is fed into the D.C. amplifier 21 which drives the graphic recorder 23 and the meter relay 22. The recorder trace 26 shows the variation with time of the viscosity of the fluid flowing through the measuring chamber 7. It may be readily seen that the gain of the D.C. amplifier 21 may be adjusted to set the sensitivity of the viscosity measuring system. The attenuator 16 may be adjusted to set the system to zero or to any reference viscosity when a calibration fluid is in the measuring chamber.

The upper and lower limit relay contacts of the meter relay 22 may be used to operate an automatic control system for the continuous maintainance of some specific narrow range of viscosity. For example, when the viscosity decreases to the extent that the low limit contact of the meter relay is actuated, material to increase the viscosity may be automatically added upstream in the process control system. Similarly, the viscosity may be automatically decreased when the upper limit contact is actuated.

Figure 2:
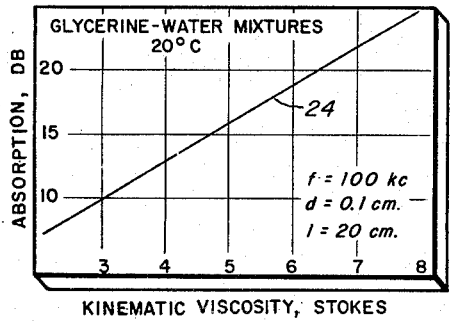
FIGURE 2 shows the relationship between ultrasonic absorption and kinematic viscosity for the viscosimeter shown in FIG. 1.

FIGURE 2 shows the plotted relationship 24 between kinematic viscosity and ultrasonic absorption for the apparatus of FIGURE 1. The absorption produced by various glycerine-water mixtures is compared with the corresponding viscosities. The data shown is for capillary tubes of 0.1 cm. inside diameter and 20 cm. length. The ultrasonic frequency is 100 kc./s.

Figure 3:
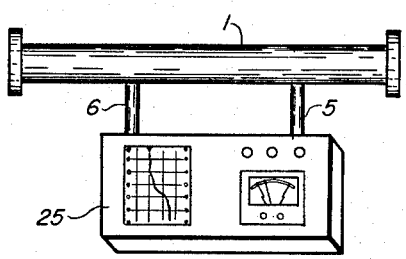
FIGURE 3 shows the overall exterior view of the viscosimeter shown in FIG. 1.

FIGURE 3 shows an overall view of the apparatus of FIGURE 1. The ultrasonic absorption measuring apparatus is contained within a housing 25 mounted directly beneath the pipe section 1. Obviously the recorder and meter indicator could be located at some remote point from the main line 1.

A bundle of capillary tubes is shown herein as a preferred embodiment of the present invention. Obviously many other types of porous solids could also be used as an alternative. For example a packing of solid spheres or a dense wire mesh, such as steel wool, could also be used. Capillary tubes, however, have proven to be most convenient. Several capillary bundles may be made available to accommodate wide ranges of viscosity. Typically these might include inside diameters of 0.01 cm., 0.05 cm. and 0.1 cm. The capillary bundle with the smallest inside diameters would be used for the least viscous fluids and the largest size for the most viscous fluids. As an alternative approach, the capillary size may be left constant and the frequency changed to accommodate various ranges of viscosity. In this latter case, the capillary size may be fixed at 0.1 cm. and frequencies of 100 kc./s., and 1 mc./s. used to achieve convenient ranges of ultrasonic absorption for a wide range of viscosities. The higher frequency would be used for the least viscous fluid and the lower frequency used for the most viscous fluid. In any event, it may be readily seen that very wide ranges of viscosity may be easily accommodated, by either a simple change of the capillary bundle cartridge or else by a simple change of the operating frequency.

In some cases, continuous transmission of ultrasonic energy could be used in measuring the ultrasonic absorption. Pulsed operation, however, is the preferred mode of operation. Short pulses should be used to prevent standing waves and interference effects. For the values shown and described for FIGURE 1, a pulse length of about 8 cycles or shorter should be approximately correct.

The ultrasonic absorption within the capillaries is also dependent on the velocity of the wave propagation. This becomes obvious from the fact that there are more wave lengths within a capillary of a given length when the ultrasonic velocity is lowered. Temperature variations are by far the most serious source of velocity changes when dealing with a particular fluid. Temperature changes also have a great effect on the viscosity of the fluid. All pure liquids (except water) have a negative thermal coefficient of sound velocity at ordinary temperature. Thus the temperature effect on the viscosity produces a change in absorption which is counteracted by the concomitant velocity change. In almost all automatic process control applications the velocity effects may be entirely ignored. In certain other cases it might be desirable to simultaneously record temperature so that the correction can later be applied to the recorded viscosity data.

It may be seen therefore that I have provided a method and apparatus for measuring the viscosity of fluids which is particularly suited to continuous flow monitoring and control systems. Various modifications may, of course, be made in the invention by those skilled in the art while retaining the essence of the invention as defined in the following claims:

I claim:

1. Apparatus for determining the viscosity of a fluid comprising: an elongated absorption chamber adapted to accommodate the inflow of a viscous fluid at one end and a corresponding outflow at the other end; a porous solid material within the central portion of the said chamber; means for transmitting a beam of ultrasonic energy along the major axis of the said chamber so as to pass through the said porous solid; means for receiving at least a portion of the ultrasonic energy after having traversed the said porous solid; means for measuring the absorption of the said ultrasonic energy caused by viscous interaction between the surface of the said porous solid and the said viscous fluid; and means for indicating the viscosity of the said fluid as a function of the said measured absorption.

2. Viscosity measuring apparatus comprising: a chamber wherein a viscous fluid may be contained; an oscillator for generating electrical signals of an ultrasonic frequency; a first ultrasonic transducer for transmitting ultrasonic signals across a portion of the said chamber in response to the said electrical signals; a second ultrasonic transducer for receiving the said ultrasonic signals; a porous solid material positioned between the said first and second transducers; means for determining the attenuation of the said ultrasonic beam while traversing the said porous solid; and means for indicating the viscosity of the said viscous fluid as a function of the said attenuation.

3. Apparatus for recording the viscosity of a continually flowing fluid comprising: an elongated chamber having an entrance port at one end and an exit port at the other end; a bundle of capillary tubes positioned within the central portion of the said chamber, the said bundle being coaxial with the said elongated chamber; means for transmitting a beam of ultrasonic energy along the axis of the said chamber so as to pass through the said capillary bundle; means for receiving at least a portion of the said ultrasonic energy after having traversed the said capillary bundle; means for measuring variations in the absorption of the said ultrasonic energy within the said capillaries as a function of time; and means for recording variations in the viscosity of the said viscous fluid as a function of the said measured absorption.

4. Apparatus for measuring the viscosity of a fluid comprising in combination: a chamber suitable for containing a viscous fluid; a pulsed oscillator having electrical signals of an ultrasonic frequency; a first transducer for transmitting ultrasonic signals through a section of the said chamber in response to the said pulsed oscillator signals; means for deriving a first D.C. voltage, the value of which is proportional to the average amplitude of the said pulsed oscillator signals; a second transducer for receiving the said ultrasonic signals after transmission across the said chamber; a porous solid positioned between the said first and second transducers; means for deriving a second D.C. voltage the value of which is proportional to the average amplitude of the said received signals; means for deriving a third D.C. voltage the value of which is proportional to the difference between said first and second D.C. voltages; and means for indicating the viscosity of the said viscous fluid as a function of the said differential voltage.

5. Apparatus for indicating variations in the viscosity of a continually flowing fluid comprising: an elongated chamber having an entrance port at one end and an exit port at the other end; a pulsed oscillator for generating electrical signals of an ultrasonic frequency; a first transducer for transmitting ultrasonic signals along the major axis of the said chamber in response to the said pulsed oscillator signals; a bundle of capillary tubes positioned within the central portion of the said chamber, the said bundle being coaxial with the said elongated chamber; a second transducer for receiving the said ultrasonic signals after transmission through the said capillary bundle; means for deriving a first D.C. voltage, the value of which is proportional to the average amplitude of the said pulsed oscillator signals; means for deriving a second D.C. voltage the value of which is proportional to the average amplitude of the said received signals; means for deriving a third D.C. voltage the value of which is proportional to the difference between the said first and second D.C. voltages; and means for recording the variations in the said differential voltage, the variations in viscosity of the said viscous fluid being thereby indicated as a function of time.

References Cited by the Examiner
UNITED STATES PATENTS

| 2,755,662 | 7/56 | Swengel | 73—54 X |
|---|---|---|---|
| 2,966,056 | 12/60 | Heiler | 73—67.6 |

RICHARD C. QUEISSER, *Primary Examiner.*

DAVID SCHONBERG, *Examiner.*